(12) United States Patent
Reyes et al.

(10) Patent No.: US 8,781,084 B2
(45) Date of Patent: Jul. 15, 2014

(54) PROVIDING SELECTIVE VOICE MAIL SERVICES

(75) Inventors: Emerando Delos Reyes, Pleasant Hill, CA (US); Benjamin J. Parker, Foster City, CA (US); Samir Ait-Ameur, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/307,223

(22) Filed: Nov. 30, 2011

(65) Prior Publication Data
US 2013/0136245 A1     May 30, 2013

(51) Int. Cl.
*H04M 1/64*     (2006.01)
(52) U.S. Cl.
USPC ..................... 379/88.25; 379/88.19
(58) Field of Classification Search
USPC ........................... 379/88.22–88.25
See application file for complete search history.

(56) References Cited

U.S. PATENT DOCUMENTS 8,000,685 B2 *   8/2011   Benco et al. .................. 455/413
2010/0150324 A1 *   6/2010   Albert et al. ............... 379/88.22

* cited by examiner

*Primary Examiner* — Simon Sing

(57) ABSTRACT

A device is configured to receive a request for a first user, of a first telephone device, to leave a voice mail message for a second user of a second telephone device; retrieve a profile associated with the second telephone device and to determine, based on the profile, whether the second telephone device is registered for a selective voice mail service; determine, based on the profile, whether the first user is allowed to leave the voice mail message when the second telephone device is registered for the selective voice mail service; and allow the first user to leave the voice mail message for the second user of the second telephone device when the second telephone device is not registered for the selective voice mail service or when the first user is allowed to leave the voice mail message.

17 Claims, 8 Drawing Sheets

PROVIDING SELECTIVE VOICE MAIL SERVICES

BACKGROUND

A user of a mobile telephone device can set up voice mail, for the mobile telephone device, to allow callers to leave voice mail messages when the user does not answer telephone calls to the mobile telephone device. Currently, any caller is able to leave a voice mail message after the caller places a call to the mobile telephone device and the user does not answer the call. As a result, the user often receives voice mail messages from callers (e.g., telemarketers) from who the user is not interested in receiving voice mail messages. The user has to spend time and energy reviewing and deleting the voice mail messages that the user did not want receive.

Furthermore, a carrier, associated with the mobile telephone device, has to provide storage capacity required to store the voice mail messages that the user does not want to receive. The carrier is forced to continuously expend resources to add storage capacity (e.g., by adding new voice mail servers) to store an increasing amount of voice mail messages, including those that subscribers, of mobile telephone devices associated with the carrier, do not want to receive.

Currently, a user of a mobile telephone device may create/provide a blacklist of telephone numbers from which to block incoming calls. However, this approach does not allow the user to only block the leaving of voice mail messages, while still allowing the calls, from those telephone numbers, to be received. Additionally, users of mobile telephone devices with any telephone numbers that are not on the blacklist are still able to leave voice mail messages. Therefore, benefits to the operator from conserving resources (e.g., storage capacity of voice mail servers), by allowing users to use blacklists, are minimal.

DETAILED DESCRIPTION OF PREFERRED EMBODIMENTS

The following detailed description refers to the accompanying drawings. The same reference numbers in different drawings may identify the same or similar elements.

A carrier may refer to one or more of a mobile network operator (MNO), a mobile telephone operator, a carrier service provider (CSP), a wireless service provider, a wireless carrier, a cellular company, and/or any other company that provides mobile telephone service(s) to users (e.g., subscribers of the carrier) via a network. A carrier network may refer to a communications network provided and operated by the carrier.

Systems and/or methods, described herein, may enable a voice mail server to only allow voice mail messages to be left, for a user, by callers whose contact information (e.g., telephone numbers) is specified by the user. For example, a voice mail server may receive a request for a caller to leave a voice mail message for a user of a mobile telephone device. The voice mail server may determine, based on a profile associated with the user and/or the mobile telephone device, whether the caller, who is calling from a particular telephone number, is allowed to leave the voice mail message. The voice mail server may allow the caller to leave the voice mail message only when the profile specifies contact information associated with the caller (e.g., an identifier (e.g, first name and/or last name) of the caller, the particular telephone number, etc.). Accordingly, the user will not receive any voice mail messages from callers whose contact information is not specified by the user, and a carrier, associated with the mobile telephone device and the voice mail server, conserves storage capacity by only storing voice mail messages that the user is interested in receiving.

Figure 1:
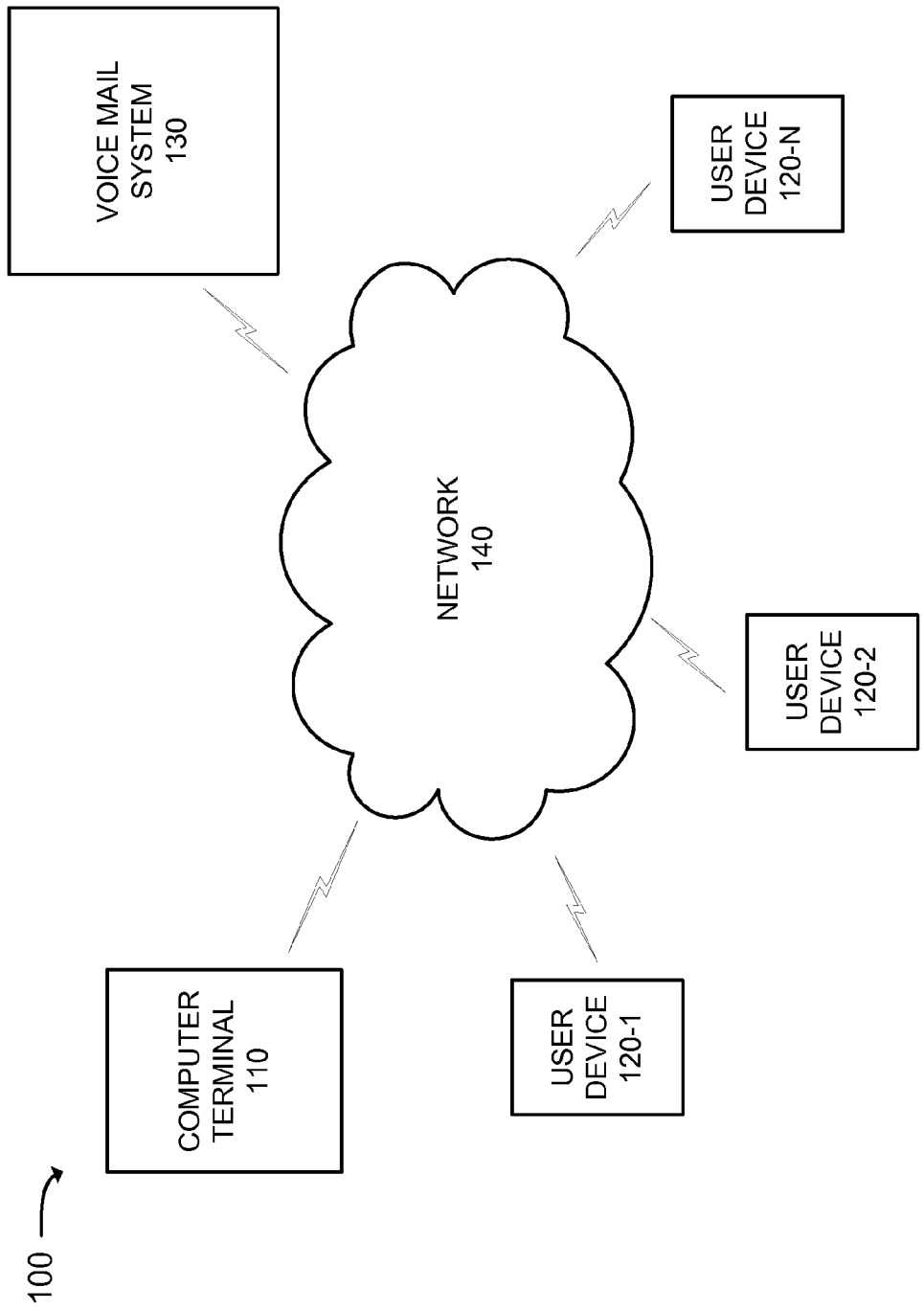
FIG. 1 is a diagram of an example environment in which systems and/or methods described herein may be implemented.

FIG. 1 is a diagram of an example environment 100 in which systems and/or methods described herein may be implemented. As shown in FIG. 1, environment 100 may include a computer terminal 110, user devices 120-1, 120-2, ..., 120-N (where N≥1) (hereinafter referred to collectively as "user devices 120" and individually as "user device 120"), a voice mail system 130, and a network 140. One computer terminal 110, three user devices 120, one voice mail system 130, and one network 140 have been illustrated in FIG. 1 for simplicity. In practice, there may be additional or fewer computer terminals 110, user devices 120, voice mail systems 130, and networks 140.

Also, in some implementations, one or more of the components of environment 100 may perform one or more functions described as being performed by another one or more of the components of environment 100. For example, computer terminal 110 and user device 120 could be integrated into a single device that performs all or some of the functions described below as being performed by an individual one of these devices.

Furthermore, two or more of the components, of FIG. 1, may be implemented within a single device, or a single device may be implemented as multiple, distributed devices. Also, components of environment 100 may interconnect via wired and/or wireless connections. In other words, any two components, of environment 100, may communicate via a wired connection, a wireless connection, or a combination of a wired connection and a wireless connection.

Computer terminal 110 may include any computation or communication device, such as a communication device that is capable of communicating with voice mail system 130 via network 140. In one implementation, computer terminal 110 may take the form of any computer device, including a web service terminal, a personal computer, a laptop computer, a handheld computer, a smart telephone, a mobile telephone device, a personal media player, etc. In another implementation, user device 120 may represent and act as computer terminal 110. A user, of user device 120, may operate computer terminal 110. In one example, the user may use computer terminal 110 to register user device 120 for a selective voice mail service provided by voice mail system 130.

User device 120 may include any computation or communication device, such as a wireless mobile communication device that is capable of communicating with other user devices 120 via network 140. For example, user device 120 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart telephone, a landline telephone, or another type of mobile computation or communication device. User device 120 may retrieve voice mail messages, which are left for user device 120, from voice mail system 130. In a Voice mail system 130 may represent a single server device or a collection of multiple server devices and/or computer systems. In one implementation, one or more network devices of network 140 may include voice mail system 130. For example, voice mail system 130 may be located within, or connect to, a packet data network (PDN) gateway (PGW) and/or a serving gateway (SGW) of network 140. In another implementation, voice mail system 130 may be located outside of network 140. In yet another implementation, voice mail system 130 may include two or more components that are inside and/or outside of network 140.

Voice mail system 130 may allow callers to leave voice mail messages for users of user devices 120. Voice mail system 130 may store the voice mail messages, and may allow the user of user devices 120 to retrieve the stored voice mail messages. Additionally, or alternatively, voice mail system 130 may allow users of user devices 120 to register user devices 120 for a selective voice mail service, and may store profiles for user devices 120. Voice mail system 130 may facilitate selective voice mail service by, for example, receiving a request for a caller to leave a voice mail message for a user of user device 120 and allowing the caller to leave the voice mail message when contact information for the caller (e.g., a telephone number being used by the caller) is specified in a profile associated with user device 120.

Network 140 may include one or more wired and/or wireless networks. For example, network 140 may include a cellular network, a public land mobile network (PLMN), a second generation (2G) network, a third generation (3G) network, a fourth generation (4G) network, a fifth generation (5G) network, and/or another network. Additionally, or alternatively, network 140 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

Figure 2:
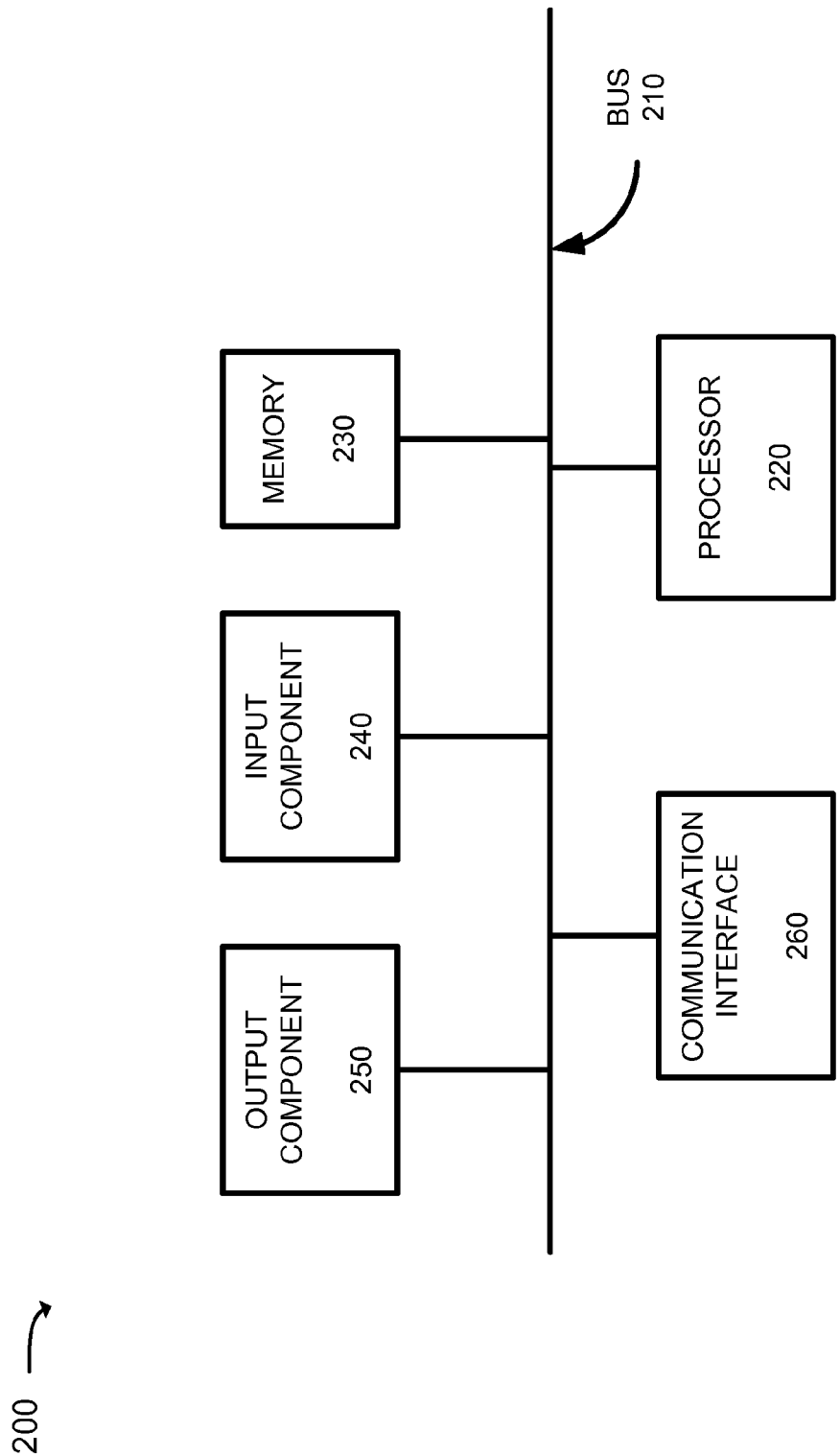
FIG. 2 is a diagram of example components of one or more of the devices of FIG. 1.

FIG. 2 is a diagram of example components of device 200 that may correspond to computer terminal 110, user device 120, and/or voice mail system 130. Each one of computer terminal 110, user device 120, and/or voice mail system 130 may include one or more devices 200 and/or one or more of each one of the components of device 200.

As shown in FIG. 2, device 200 may include a bus 210, a processor 220, a memory 230, an input component 240, an output component 250, and a communication interface 260. In another implementation, device 200 may include additional components, fewer components, different components, and/or differently arranged components than are shown in FIG. 2. Additionally, or alternatively, one or more components of device 200 may perform one or more tasks described as being performed by one or more other components of device 200.

Bus 210 may include a path, or a collection of paths, that permits communication among the components of device 200. Processor 220 may include a processor, microprocessor, or processing logic that may interpret and execute instructions. Memory 230 may include any type of dynamic storage device that may store information and instructions for execution by processor 220, and/or any type of non-volatile storage device that may store information for use by processor 220.

Input component 240 may include one or more input mechanisms that permit a user to input information to device 200. Output component 250 may include one or more output mechanisms that output information to the user. Examples of input and output mechanisms may include buttons; a touch screen interface to permit data and control commands to be input into device 200, a speaker to receive electrical signals and output audio signals, a microphone to receive audio signals and output electrical signals, a display to output visual information (e.g., web pages, product information, etc.), etc.

Communication interface 260 may include any transceiver-like mechanism that enables device 200 to communicate with other devices and/or systems. For example, communication interface 260 may include an Ethernet interface, an optical interface, a coaxial interface, a wireless interface, or the like.

Device 200 may perform certain operations described herein. Device 200 may perform these operations in response to processor 220 executing software instructions (e.g., computer program(s)) contained in a computer-readable medium, such as memory 230, a secondary storage device (e.g., hard disk, CD-ROM, etc.), or other forms of RAM or ROM. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
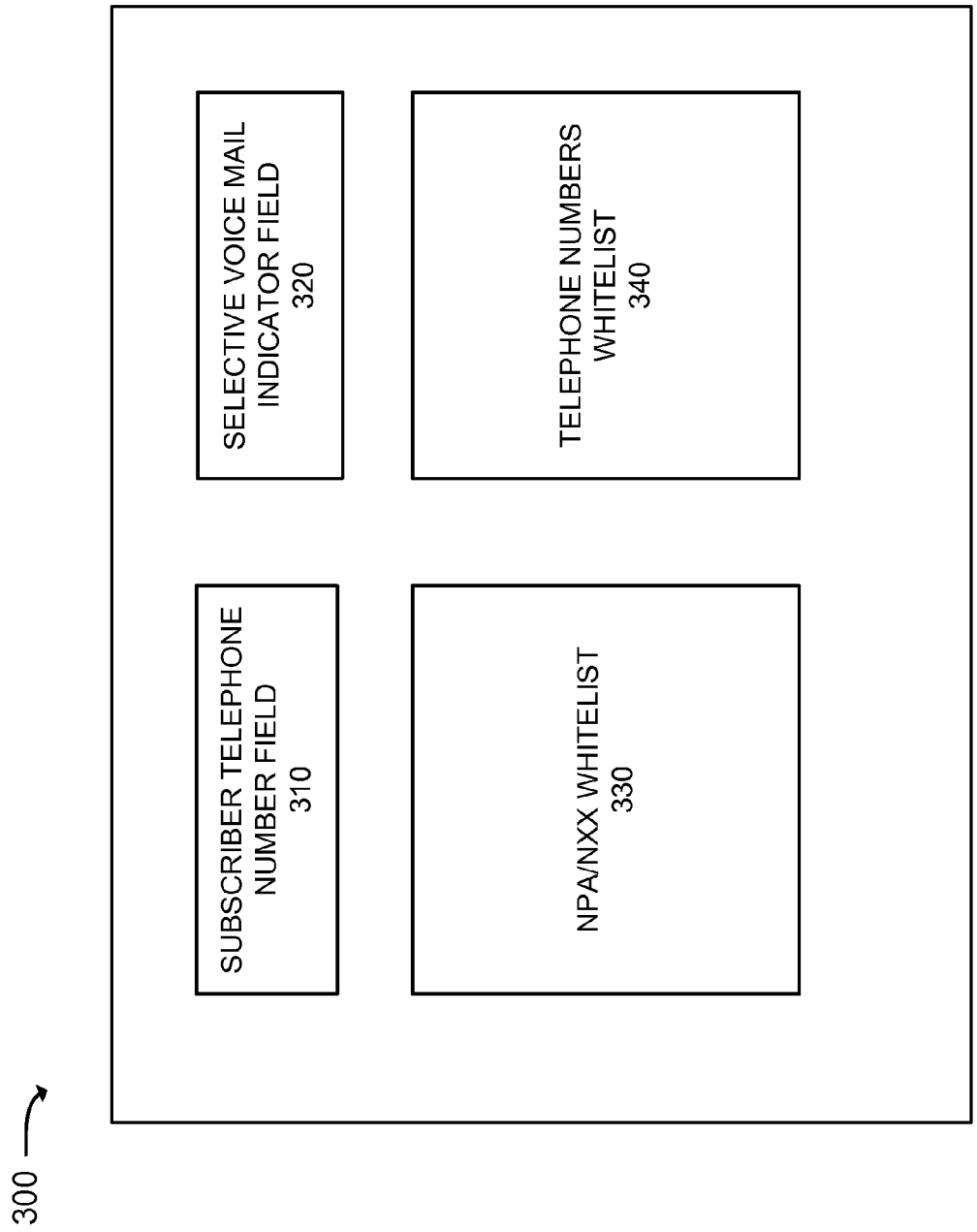
FIG. 3 illustrates an example portion of a profile of a user.

FIG. 3 illustrates an example portion of a profile 300 of a user. For example, as shown in FIG. 3, profile 300 may include a subscriber telephone number field 310, a selective voice mail indicator field 320, a numbering plan area code (NPA)/a central office (exchange) code (NXX) whitelist 330, and/or a telephone numbers whitelist 340. In practice, profile 300 may include additional components, fewer components, different components, and/or differently arranged components than are shown in FIG. 3. Voice mail system 130 may generate, store, retrieve, and/or modify profile 300.

Subscriber telephone number field 310 may store a telephone number associated with user device 120. A carrier, associated with user device 120, may assign the telephone number to user device 120 when, for example, a user of user device 120 acquires (e.g., buys) user device 120 from the carrier. The telephone number may uniquely identify/correspond to profile 300 associated with user device 120. The telephone number may include, for example, a telephone number based on a telephone numbering plan (e.g., 202-555-5555) or a session initiation protocol (SIP) uniform resource identifier (URI) telephone number (e.g., sip:1555000000@host:5060;user=telephone or sip:192.168.1.51:5060).

Selective voice mail indicator field 320 may store an indicator that indicates whether user device 120, associated with profile 300, is registered for a selective voice mail service. For example, selective voice mail indicator field 320 may include one of two values, including a first value (e.g., "YES" or "Y") that indicates that user device 120 is registered for the selective voice mail service and a second value (e.g., "NO" or "N") that indicates that user device 120 is not registered for the selective voice mail service. After registering user device 120 for the selective voice mail service, the user may turn-off the selective voice mail service when the user no longer wants to use the selective voice mail service for user device 120. When the selective voice mail service is turned off, voice mail indicator field 320 may indicate that user device 120 is not registered for the selective voice mail service.

NPA/NXX whitelist 330 may store identifiers of one or more blocks of telephone numbers that are allowed to be used to call from and leave voice mail messages for the user of user device 120 associated with profile 300. In one implementation, NPA/NXX whitelist 330 may include one or more NPAs (e.g., 202), one or more NXXs (e.g., 555), and/or one or more combinations of NPAs and NXXs (e.g., 202-555). For example, a telephone number 202-555-1212 is within a block of telephone numbers identified by the NPA of 202, the NXX of 555, and/or the NPA/NXX combination of 202-555. Accordingly, someone who is calling from the telephone number 202-555-1212 may be allowed, based on NPA/NXX whitelist 330, to leave a voice mail message for the user. Additionally, or alternatively, NPA/NXX whitelist 330 may include SIP URI combinations, which are portions of SIP URI telephone numbers.

Telephone numbers whitelist 340 may store one or more telephone numbers that are allowed to be used to call from and leave voice mail messages for the user of user device 120 associated with profile 300. Telephone numbers whitelist 340 may include one or more telephone numbers based on a telephone numbering plan and/or one or more SIP URI telephone numbers.

Additionally, or alternatively, profile 300 may include one or more whitelists that include identifiers associated with contact information of callers that is different from information stored in NPA/NXX whitelist 330 or telephone numbers whitelist 340. For example, profile 300 may include a whitelist that includes identifiers (e.g., full names, first names and/or last names, etc.) associated with callers who are allowed to leave voice mail messages for the user of user device 120 associated with profile 300. Voice mail system 130 may determine an identifier of a caller associated with a particular user device 120 from which a call is made by using (services of) a caller identification (ID) system. Voice mail system 130 may allow the caller to leave the voicemail system when an identifier or a portion of an identifier (e.g., a last name) matches one of the identifiers in the whitelist.

Alternatively, profile 300 may include one or more blacklists (not shown in FIG. 3). The blacklists may specify one or more telephone numbers and/or one or more blocks of telephone numbers that are not allowed to leave voice mail messages for the user of user device 120. The user may select whether to use blacklists or whitelists for the selective voice mail service.

Figure 4:
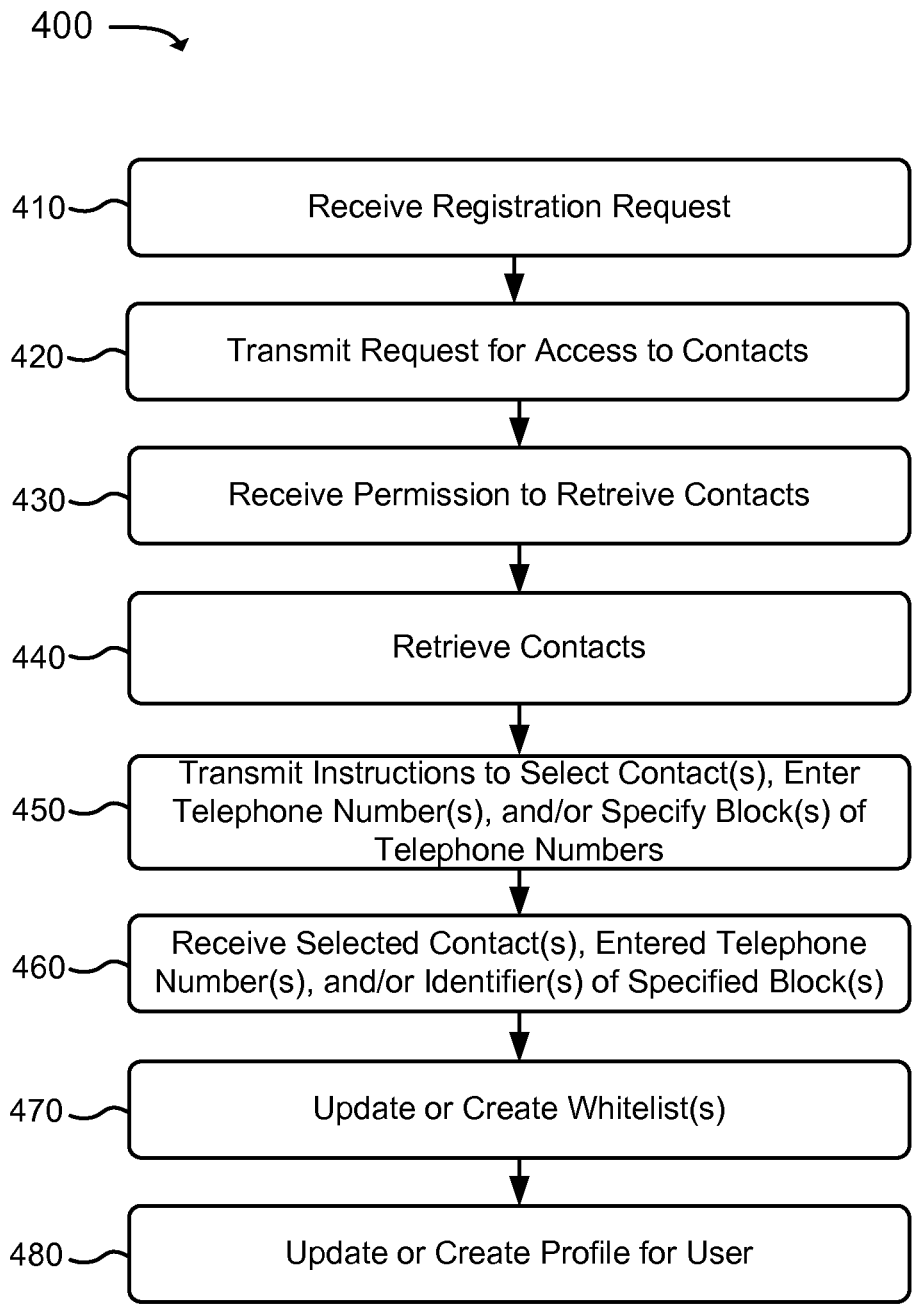
FIG. 4 is a flow chart of an example process for registering a user device for a selective voice mail service.

FIG. 4 is a flow chart of an example process 400 for registering user device 120 for a selective voice mail service. In one implementation, voice mail system 130 may perform process 400. In another implementation, a device or collection of devices separate from, or in combination with, voice mail system 130 may perform some or all of process 400. For example, computer terminal 110 and/or user device 120 may perform one or more of the operations described as being performed by voice mail system 130.

As shown in FIG. 4, process 400 may include receiving a registration request (block 410). For example, a user may decide to register user device 120, of the user, for a selective voice mail service provided by voice mail system 130. To register, the user may use, for example, computer terminal 110 to access a website associated with voice mail system 130. The user may access a registration interface (e.g., web page(s)) via the website. Thereafter, in one implementation, the user may request (e.g., by clicking a button) to register user device 120 for the selective voice mail service, and the registration interface may prompt the user to enter user information associated with the user and/or user device 120 (e.g., a username, a password, a telephone number associated user device 120, a identifier associated with user device 120, etc.). Voice mail system 130 may receive, as part of a registration request, the request to register user device 120 for the selective voice mail service and/or the entered user information.

Process 400 may further include transmitting a request for access to contacts (block 420), receiving permission to retrieve the contacts (block 430), and retrieving the contacts (block 440). For example, after receiving the registration request, voice mail system 130 may transmit a request for access to contacts stored by user device 120. Each one of the contacts may include, for example, an identifier (e.g., a first name and/or last name) associated with a person and a telephone number associated with that person. In response to the request for access, the user may use user device 120 and/or computer terminal 110 to provide permission for voice mail system 130 to retrieve the contacts of the user from user device 120. Voice mail system 130 may receive, from user device 120 and/or computer terminal 110, the permission to retrieve the contacts. Based on the permission to retrieve the contacts, voice mail system 130 may retrieve the contacts of the user from user device 120. To retrieve the contacts, voice mail system 130 may transmit instructions to user device 120 to send contact information stored by user device 120. In response to the instructions, user device 120 may send the contact information to voice mail system 130.

Process 400 may also include transmitting instructions to select one or more contacts, enter one or more telephone numbers, and/or specify one or more blocks of telephone numbers (block 450) and receiving the one or more selected contacts, the one or more entered telephone numbers, and/or identifiers of the one or more specified blocks (block 460). For example, after retrieving the contacts of the user, voice mail system 130 may generate instructions for the user to select one or more of the contacts, enter one or more telephone numbers, and/or specify one or more blocks of telephone numbers. The instructions may inform the user that information provided by the user will be used to determine which other user devices 120 or people will be allowed to leave voice mail messages for the user when the other user devices 120 or people are used to make calls to user device 120 and the user does not answer the calls. Voice mail system 130 may transmit, to computer terminal 110 or user device 120, the instructions to select one or more contacts, enter one or more telephone numbers, and/or specify one or more blocks of telephone numbers. The user may use computer terminal 110 or user device 120 to select one or more of the contacts, enter one or more telephone numbers, and/or provide one or more identifiers of one or more blocks of telephone numbers. The one or more identifiers of one or more blocks may include, for example, one or more NPAs, one or more NXXs, one or more combinations of NPAs and NXXs, and/or one or more SIP URI combinations. Voice mail system 130 may receive, from computer terminal 110 or user device 120, the one or more selected contacts, the one or more entered telephone numbers, and the one or more the identifiers of the one or more specified blocks of telephone numbers.

Process 400 may also include creating whitelists (block 470). For example, for each one of the contacts selected by the user, voice mail system 130 may identify a telephone number of the contact. In one implementation, voice mail system 130 may update or create a telephone numbers whitelist by including, in the telephone numbers whitelist, the identified telephone numbers, which correspond to the selected contacts, and the entered telephone numbers. Additionally, or alternatively, voice mail system 130 may update or create a blocks of telephone numbers whitelist by including the identifiers of the one or more specified blocks in the blocks of telephone numbers whitelist.

Alternatively, a user may select to use blacklists, instead of whitelists, for the selective voice mail service. The user may provide one or more telephone numbers and/or one or more blocks of telephone numbers from which the user does not want to allow voice mail messages to be left for user device 120-1. Voice mail system 130 may update or create one or more blacklists, which specify the one or more telephone numbers and/or the one or more blocks of telephone numbers provided by the user.

Figure 7:
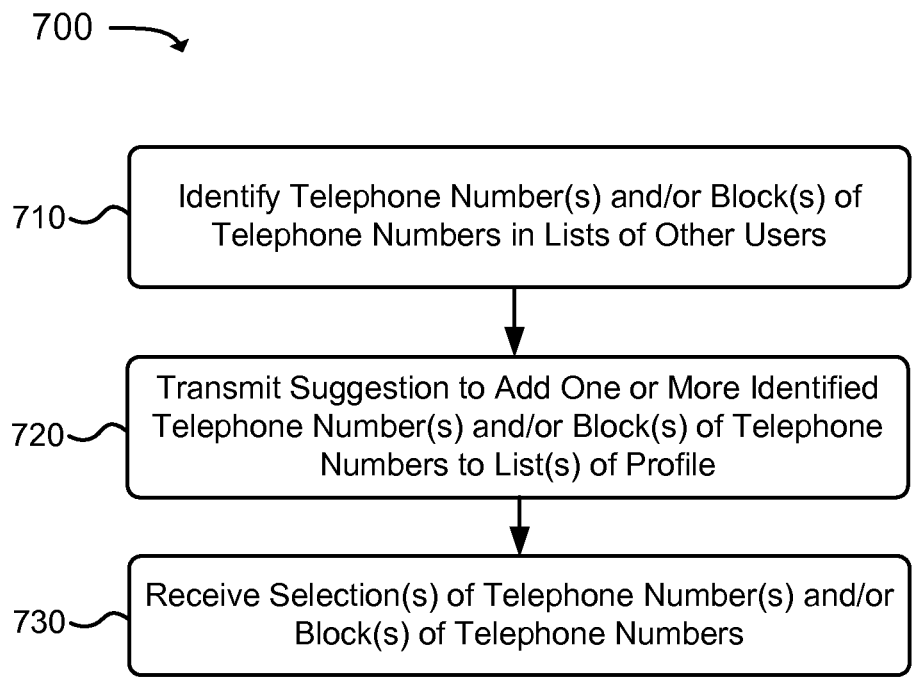
FIG. 7 is a flow chart of an example process for suggesting adding telephone numbers and/or blocks of telephone numbers to lists of a profile of a user.

Additionally, or alternatively, voice mail system 130 may identify telephone numbers and/or blocks of telephone numbers that are specified in whitelists or blacklists of a particular quantity of users. FIG. 7 is a flow chart of an example process 700 for suggesting adding telephone numbers and/or blocks of telephone numbers to lists of a profile of a user. In one implementation, voice mail system 130 may perform process 700 during process 400. In another implementation, a device or collection of devices separate from, or in combination with, voice mail system 130 may perform some or all of process 700 before, during, and/or after process 400.

As shown in FIG. 7, process 700 may include identifying one or more telephone numbers and/or one or more blocks of telephone numbers in lists of other users (block 710). For example, a particular block of telephone numbers, which include a particular NPA and NXX combination, may correspond to known sources of voice mail spam. Users who receive voice mail message spam from a telephone number, which is included in the particular block of telephone numbers, may add the telephone numbers to a blacklist that specifies telephone numbers from which the users does not want to allow voice mail messages to be left for user device 120. Voice mail system 130 may recognize that a particular quantity of telephone numbers added to blacklists of different users share the particular NPA and NXX combination. Accordingly, voice mail system 130 may determine that telephone numbers with the particular NPA and NXX combination are likely to correspond to known sources of voice mail spam. Voice mail system 130 may identify one or more telephone numbers and/or one or more blocks of telephone numbers based on the particular NPA and NXX combination.

Process 700 may further include transmitting a suggestion to add one or more of the identified telephone numbers and/or one or more of the identified blocks of telephone numbers to one or more list(s) of a profile (block 720). In one implementation, voice mail system 130 may transmit, to user device 120, a suggestion that suggests for the user to add one or more of the identified telephone numbers and/or one or more of the identified blocks of telephone numbers to whitelists or blacklists of a profile of user device 120 when the user is registering user device 120 for the selective voice mail service. Further to the example above, voice mail system 130 may suggest adding the particular NPA and NXX combination to a blacklist of a profile when, for example, a new user is registering user device 120, associated with the profile, for the selective mail service.

Process 700 may also include receiving one or more selections of telephone numbers and/or one or more blocks of telephone numbers. For example, the user may use user device 120 to select one or more of the suggested telephone numbers and/or one or more of the suggested blocks of telephone numbers to be included the whitelists or the blacklists of the profile. User device 120 may transmit the selections to voice mail system 130, and voice mail system 130 may receive the selections. Voice mail system 130 may add one or more selected telephone numbers and/or one or more selected blocks of telephone numbers to lists of the profile, as described further below with reference to block 480 of FIG. 4.

Returning to FIG. 4, process 400 may also include updating or creating a profile for the user (block 480). For example, voice mail system 130 may store profiles for different user devices 120. If voice mail system 130 does not store a profile for user device 120 of the user, voice mail system 130 may create the profile. If voice mail system 130 already stores the profile for user device 120 of the user, voice mail system 130 may update the profile based on new information (e.g., new telephone numbers and/or identifiers of new blocks of telephone numbers) provided by the user. In one example, voice mail system 130 may identify an existing profile 300 (FIG. 3) for user device 120 of the user. Voice mail system 130 may update selective voice mail indicator field 320, of profile 300, to indicate that user device 120 is registered for the selective voice mail service. Voice mail system 130 may further add the telephone numbers from the telephone numbers whitelist to telephone numbers whitelist 340 of profile 300. Voice mail system 130 may also add the identifiers from the blocks of telephone numbers whitelist to NPA/NXX whitelist 330 of profile 300.

Voice mail system 130 may retrieve the profile (e.g., profile 300) when voice mail system 130 receives a request to leave a voice mail message for the user of user device 120, as described further below with reference to FIG. 5. The user may use computer terminal 110 and/or user device 120 to request and review information (e.g., the selected contacts) of the profile of user device 120. The user may further use computer terminal 110 and/or user device 120 to modify the profile, by using techniques similar to those described above with reference to process 400.

Figure 5:
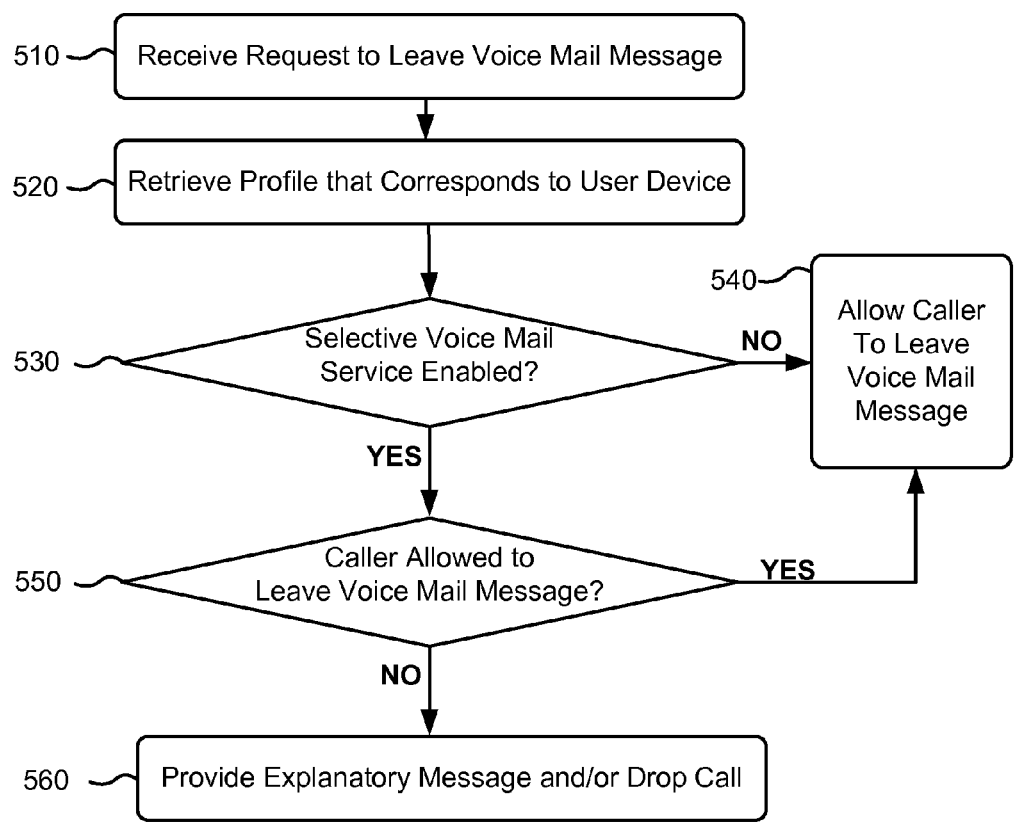
FIG. 5 is a flow chart of another example process for providing a selective voice mail service.

FIG. 5 is a flow chart of another example process 500 for providing a selective voice mail service. In one implementation, voice mail system 130 may perform process 500. In another implementation, a device or collection of devices separate from, or in combination with, voice mail system 130 may perform some or all of process 500.

As shown in FIG. 5, process 500 may include receiving a request to leave a voice mail message (block 510). For example, assume that a caller uses user device 120-2 to place a call to user device 120-1 of a user, and that the user does not answer the call. When the call is not answered, voice mail system 130 may receive a request for the caller to leave a voice mail message for the user of user device 120-1. The request, to leave the voice mail message, may include a first telephone number of user device 120-1 and a second telephone number of user device 120-2.

Process 500 may further include retrieving a profile that corresponds to a user device (block 520) and determining whether the selective voice mail service is enabled (block 530). For example, voice mail system 130 may retrieve profile 300 (FIG. 3) that corresponds to user device 120-1 based on the first telephone number, of user device 120-1, included in the request to leave the voice mail message. Voice mail system 130 may determine based on, for example, selective voice mail indicator field 320, of profile 300, whether the selective voice mail service is enabled for user device 120-1.

If the selective voice mail service is not enabled (block 530—NO), process 500 may include allowing the caller to leave the voice mail message (block 540). For example, when voice mail system 130 determines that selective voice mail indicator field 320 indicates that user device 120 is not registered for the selective voice mail service, voice mail system 130 may allow the caller to leave the voice mail message for the user of user device 120-1. Voice mail system 130 may store the voice mail message, may provide a notification of the voice mail message, and may provide the voice mail message when the user retrieves voice mail messages associated with user device 120-1.

If the selective voice mail service is enabled (block 530—YES), process 500 may include determining whether the caller is allowed to leave the voice mail message (block 550). For example, when voice mail system 130 determines that selective voice mail indicator field 320 indicates that user device 120 is registered for the selective voice mail service, voice mail system 130 may determine whether the caller is allowed to leave the voice mail message. Voice mail system 130 may identify the second telephone number (e.g., 202-555-1212) of user device 120-2 of the caller. Voice mail system 130 may further determine/identify one or more portions of the telephone number, including an NPA (e.g., 202) and an NPX (e.g., 555) associated with the telephone number. Voice mail system 130 may determine whether the second telephone number is within one of one or more blocks of telephone numbers specified in NPA/NXX whitelist 330 based on the determined NPA and/or the determined NXX. If the second telephone number is within one of the one or more blocks of telephone numbers specified in NPA/NXX whitelist 330, then voice mail system 130 may determine that the caller is allowed to leave the voice mail message.

Additionally, or alternatively, if the second telephone number is not within one of the one or more blocks of telephone numbers specified in NPA/NXX whitelist 330, then voice mail system 130 may determine whether the second telephone number matches one of one or more telephone numbers in telephone numbers whitelist 340. If the second telephone number matches one of the one or more telephone numbers in telephone numbers whitelist 340, then voice mail system 130 may determine that the caller is allowed to leave the voice mail message. If the second telephone number is not within one of the one or more blocks of telephone numbers specified in NPA/NXX whitelist 330 and the second telephone number does not match one of the one or more telephone numbers in telephone numbers whitelist 340, then voice mail system 130 may determine that the caller is not allowed to leave the voice mail message for user device 120-1 of the user.

If the caller is allowed to leave the voice mail message (block 550—YES), process 500 may include allowing the caller to leave the voice mail message (block 540). For example, when voice mail system 130 determines that the caller is allowed to leave the voice mail message for the user of user device 120-1, after the caller uses user device 120-2 to make a call to user device 120-1, voice mail system 130 may allow the caller to leave the voice mail message for the user of user device 120-1, as described above.

If the caller is not allowed to leave the voice mail message (block 550—NO), process 500 may include providing an explanatory message and/or dropping a call (block 560). For example, assume that voice mail system 130 determines that the caller is not allowed to leave the voice mail message for the user of user device 120-1. In one implementation, voice mail system 130 may provide an explanatory message to user device 120-2 to indicate to the caller that the caller cannot leave the voice mail message for the user of user device 120-1. The explanatory message may include a particular signal (e.g., a busy signal) or a recorded message (e.g., "a voice mail message cannot be left"). Voice mail system 130 may drop the call from user device 120-2 after providing the explanatory message. In another implementation, voice mail system 130 may drop the call from user device 120-2 without providing any explanatory message.

Additionally, or alternatively, user device 120-1 may store whitelists or blacklists of telephone numbers and/or blocks of telephone numbers provided by the user of user device 120-1. When the user requests, from voice mail system 130, voice mail messages stored for user device 120-1, the user may provide the whitelists or the blacklists. Voice mail system 130 may retrieve one or more of the stored voice mail messages based on the provided whitelists or blacklists.

For example, user device 120-1 may store a whitelist that only includes two telephone numbers. User device 120-1 may transmit, to voice mail system 130, a request for voice mail messages that have been stored for user device 120-1. The request for the voice mail messages may include the whitelist stored by user device 120-1. Based on the whitelist, voice mail system 130 may only retrieve voice mail messages that have been left, for the user of user device 120-1, by callers who called from user devices 120 with one of the two telephone numbers in the whitelist. Voice mail system 130 may transmit the retrieved voice mail messages to user device 120-1. As a result, the user of user device 120-1 does not have to listen to any other voice mail messages that were left by callers who called from user devices 120 whose telephone numbers are not listed in the whitelist.

Figure 6:
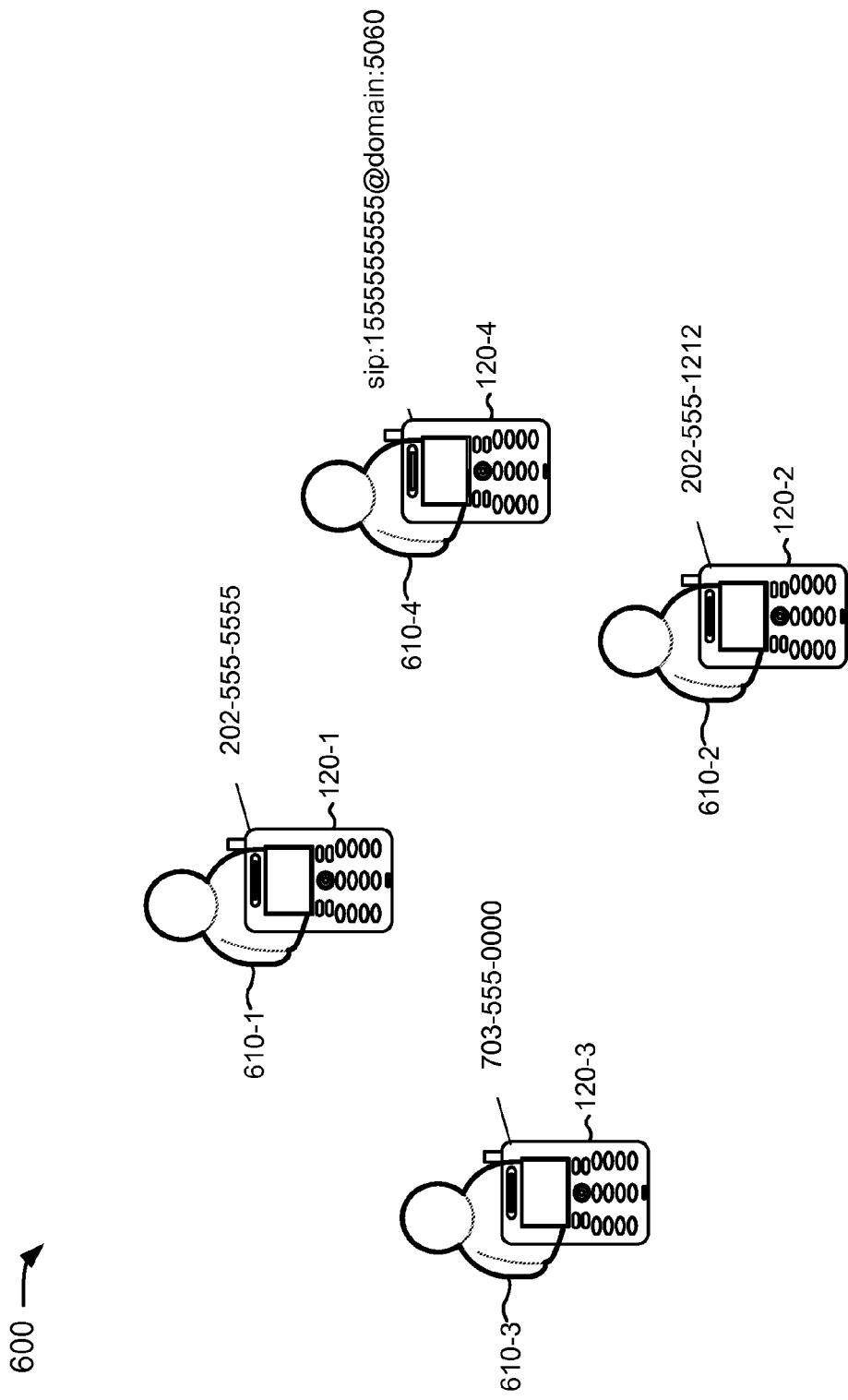
FIG. 6 is a diagram that illustrates an example of providing a selective voice mail service.

FIG. 6 is a diagram that illustrates an example 600 of providing a selective voice mail service. Assume that a user 610-1, a subscriber of a particular cellular service, uses user device 120-1; a user 610-2, a friend of user 610-1, uses user device 120-2; a user 610-3, a telemarketer, uses user device 120-3; and a user 610-4, a co-worker of user 610-1, uses user device 120-4. Further assume that user device 120-1 is assigned a telephone number of 202-555-5555, user device 120-2 is assigned a telephone number of 202-555-1212, user device 120-3 is assigned a telephone number of 703-555-0000, and user device 120-3 is assigned a telephone number of sip:1555555555@domain:5060.

Assume that voice mail system 130 stores profile 300 (FIG. 3) for user device 120-1 that is associated with the telephone number of 202-555-5555 of user device 120-1. User 610-1 may register user device 120-1 for the selective voice mail service. Assume that profile 300 includes NPA/NXX whitelist 330 that only specifies one block of telephone numbers, specified by user 610-1, that includes an NPA/NXX combination of 202-555 and telephone numbers whitelist 340 that only includes the telephone number, specified by user 610-1, of sip:1555555555@domain:5060.

Assume that user 610-2 uses user device 120-2 to make a call to user device 120-1, and user 610-1 does not answer the call. Voice mail system 130 may allow user 610-2 to leave a voice mail message because the telephone number of user device 120-2, 202-555-1212, includes the NPA/NXX combination of 202-555, which is specified in NPA/NXX whitelist 330.

Assume that user 610-3 uses user device 120-3 to place a call to user device 120-1, and user 610-1 does not answer the call. Voice mail system 130 may not allow user 610-3 to leave a voice mail message because the telephone number of user device 120-3, (703) 555-0000, does not include the NPA/NXX combination of 202-555, which is specified in NPA/NXX whitelist 330, and does not match the telephone number of sip:1555555555@domain:5060, which is the only telephone number listed in telephone numbers whitelist 340.

Assume that user 610-4 uses user device 120-4 to make a call to user device 120-1, and user 610-1 does not answer the call. Voice mail system 130 may allow user 610-4 to leave a voice mail message because the telephone number of user device 120-4, sip:1555555555@domain:5060, matches the telephone number listed in telephone numbers whitelist 340.

As a result, user 610-1 does not have to review and delete an undesired voice mail message from user device 120-3 of user 610-3 (i.e., the telemarketer). Furthermore, the provider of the cellular service to user device 120-1 saves storage capacity in voice mail system 130 by not having to store a voice mail message provided from user device 120-3 for user device 120-1.

Figure 8:
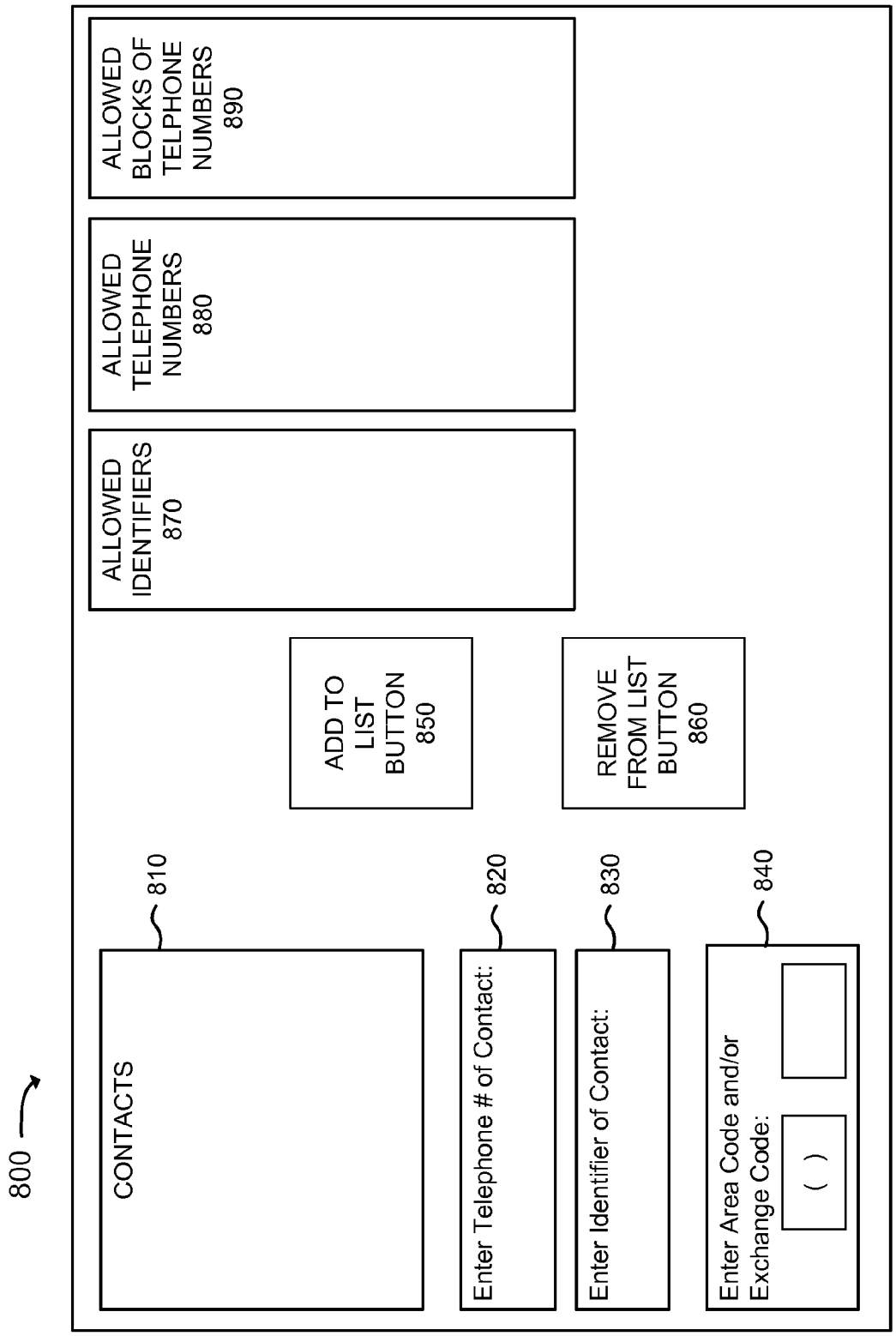
FIG. 8 is an example user interface for adding and/or removing information from whitelists of a profile of a user.

FIG. 8 is an example user interface 800 for adding and/or removing information from whitelists of a profile of a user. A user may use user interface 800 during or after registering user device 120 for a selective voice mail service provided by voice mail system 130. Voice mail system 130 may provide user interface 800 to computer terminal 110 or user device 110. As shown in FIG. 8, user interface 800 may include a contacts list 810, a telephone number entry field 820, an identifier entry field 830, a block of telephone numbers entry field 840, an add button 850, a remove button 860, an allowed identifiers list 870, an allowed telephone numbers list 880, and an allowed blocks of telephone numbers list 890. These user interface components have been illustrated in FIG. 8 as an example. In practice, user interface 800 may include additional user interface components, fewer user interface components, different user interface components, and/or differently arrange user interface components.

Assume that computer terminal 110 displays user interface 800. Contacts list 810 may include a listing of contacts that are retrieved from user device 120, as described above with reference to block 440 of FIG. 4. The list of contacts may include an identifier (e.g., a first name and a last name) and/or a telephone number for each contact in the list of contacts. In one example, assume that the user selects one or more contacts in contact list 810, by selecting identifiers and/or telephone numbers associated with the one or more contacts, and selects add button 850. In response, computer terminal 110 and/or voice mail system 130 may update user interface 800 by adding identifiers associated with the one or more contacts to allowed identifiers list 870 and/or by adding telephone numbers associated with the one or more contacts to allowed telephone numbers list 880.

In another example, assume that the user enters a telephone number into telephone number entry field 820, and selects add button 850. In response, computer terminal 110 and/or voice mail system 130 may update user interface 800 by adding the telephone number to allowed telephone numbers list 880. In yet another example, assume that the user enters a first name and/or a last name into identifier entry field 830, and selects add button 850. In response, computer terminal 110 and/or voice mail system 130 may update user interface 800 by adding the first name and/or the last name to allowed identifiers list 870. In still yet another example, assume that the user enters an NPA and/or an NXX, and selects add button 850. In response, computer terminal 110 and/or voice mail system 130 may update user interface 800 by adding the NPA and/or the NXX to allowed blocks of telephone numbers list 890.

Assume that a user selects an identifier from allowed identifiers list 870, and selects remove button 860. In response, computer terminal 110 and/or voice mail system 130 may update user interface 800 by removing the selected identifier from allowed identifiers list 870. In another example, assume that a user selects a telephone number from allowed telephone numbers list 880, and selects remove button 860. In response, computer terminal 110 and/or voice mail system 130 may update user interface 800 by removing the selected telephone number from allowed telephone numbers list 880. In yet another example, assume that a user selects an NPA and/or an NXX from allowed blocks of telephone numbers list 890, and selects remove button 860. In response, computer terminal 110 and/or voice mail system 130 may update user interface 800 by removing the selected NPA and/or the selected NXX from allowed blocks of telephone numbers list 890.

Allowed identifiers list 870 and/or allowed telephone numbers list 880 correspond to telephone numbers whitelist 340 (FIG. 3). When computer terminal 110 and/or voice mail system 130 updates allowed identifiers list 870 and/or allowed telephone numbers list 880, voice mail system 130 may also update telephone numbers whitelist 340 by adding an identifier and/or a telephone number to telephone numbers whitelist 340 or removing an identifier and/or a telephone number from telephone numbers whitelist 340.

Allowed blocks of telephone numbers list 890 corresponds to NPA/NXX whitelist 330 (FIG. 3). When computer terminal 110 and/or voice mail system 130 updates allowed blocks of telephone numbers list 890, voice mail system 130 may also update NPA/NXX whitelist 330 by adding an NPA and/or an NXX to NPA/NXX whitelist 330 or removing an NPA and/or an NXX from NPA/NXX whitelist 330.

The foregoing description provides illustration and description, but is not intended to be exhaustive or to limit the embodiments to the precise form disclosed. Modifications and variations are possible in light of the above teachings or may be acquired from practice of the embodiments.

While series of blocks have been described with regard to FIGS. 4 and 5, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
receiving, by a server device, contact information associated with a first user or a first telephone device from the first telephone device, wherein the contact information includes user names and corresponding telephone numbers;
creating, by the server device, one or more whitelists of telephone numbers based on the contact information and storing the one or more whitelists as part of a profile associated with the first telephone device;
receiving, by the server device, a request for a second user, of a second telephone device, to leave a voice mail message for the first user of the first telephone device;
retrieving, by the server device, the profile associated with the first telephone device;
determining, by the server device and based on the profile, whether the second user is allowed to leave the voice mail message for the first user of the first telephone device based on the contact information associated with the second user or the second telephone device, by determining whether a telephone number of the second user device is in the one or more whitelists;
allowing the second user to leave the voice mail message for the first user of the first telephone device in response to determining that the telephone number is in the one or more whitelists; and
preventing the second user from leaving the voice mail message in response to determining that the telephone number is not in the one or more whitelists,
wherein determining whether the second user is allowed to leave the voice mail message comprises:
determining, based on a particular field of the profile, whether the first telephone device is registered for a selective voice mail service provided by a carrier associated with the first telephone device, and
determining that the second user is allowed to leave the voice mail message in response to determining that the first telephone device is not registered for the selective voice mail service.

2. The method of claim 1, where preventing the second user from leaving the voice mail message comprises:
providing a message to the second telephone device that indicates that the second user cannot leave the voice mail message, or
dropping a call associated with the request to leave the voice mail message.

3. The method of claim 1,
where the request comprises a telephone number of the first telephone device, and
where retrieving the profile associated with the first telephone device comprises:
identifying the telephone number of the first telephone device based on the request, and
retrieving the profile that corresponds to the first telephone device based on the telephone number.

4. The method of claim 1, where the telephone number is based on a telephone numbering plan or is a session initiation protocol (SIP) uniform resource identifier (URI) telephone number.

5. The method of claim 1, wherein preventing the first user from leaving the voice mail message comprises:
providing a message to the first telephone device that indicates that the first user cannot leave the voice mail message, or
dropping a call associated with the request to leave the voice mail message;
wherein the request comprises a telephone number of the second telephone device; and
wherein retrieving the profile associated with the second telephone device comprises:
identifying the telephone number of the second telephone device based on the request, and
retrieving the profile that corresponds to the second telephone device based on the telephone number.

6. The method of claim 1, wherein preventing the first user from leaving the voice mail message comprises:
providing a message to the first telephone device that indicates that the first user cannot leave the voice mail message, or
dropping a call associated with the request to leave the voice mail message; and
wherein the telephone number is based on a telephone numbering plan or is a session initiation protocol (SIP) uniform resource identifier (URI) telephone number.

7. A server device comprising:
a memory to store:
a profile for a first telephone device;
a processor to:
receive a request for a user of a second telephone device to leave a voice mail message for the first telephone device after the user makes a call to the first telephone device by using the second telephone device and the call is not answered,
where the request comprises:
a first telephone number assigned to the first telephone device, and
contact information associated with the user or the second telephone device,
retrieve the profile based on the first telephone number,
determine, based on the profile and the contact information, whether the user is allowed to leave the voice mail message for the first telephone device by:
determining, based on a particular field of the profile, whether the first telephone device is registered for a selective voice mail service provided by a carrier associated with the first device, and
determining that the user is allowed to leave the voice mail message at the server device when the first telephone device is not registered for the selective voice mail service,
allow the user to leave the voice mail message when it is determined that the user is allowed to leave the voice mail message, and
prevent the user from leaving the voice mail message when it is determined that the user is not allowed to leave the voice mail message.

8. The server device of claim 7, where, when preventing the user from leaving the voice mail message, the processor is further to:
provide a message to the second telephone device that indicates that the user cannot leave the voice mail message, and
drop the call.

9. The server device of claim 7, where, when determining whether the user is allowed to leave the voice mail message, the processor is further to:

determine, when the user is registered for the selective voice mail service, whether the contact information is specified in the profile, and determine that the user is allowed to leave the voice mail message when the contact information is specified in the profile.

10. The server device of claim 7, where the profile comprises a blocks of telephone numbers whitelist, where the contact information comprises a second telephone number assigned to the second telephone device, and where, when determining whether the user is allowed to leave the voice mail message, the processor is further to:

determine whether the second telephone numbers is within a block of telephone numbers specified in the blocks of telephone numbers whitelist, and determine that the user is allowed to leave the voice mail message when the second telephone number is within the block of telephone numbers.

11. The server device of claim 10, where the blocks of telephone numbers whitelist comprises an identifier associated with the block of telephone numbers, where, when determining whether the second telephone number is within the block of telephone numbers, the processor is further to:

identify a portion of the second telephone number, determine whether the portion matches the identifier, and determine that the second telephone numbers is within the block of telephone numbers when the portion matches the identifier.

12. The server device of claim 10, where the profile further comprises a telephone numbers whitelist, where, when determining whether the user is allowed to leave the voice mail message, the processor is further to:

determine, when the second telephone number is not within the block of telephone numbers, whether the second telephone number matches any telephone number listed in the telephone numbers whitelist, and determine, when the second telephone number matches a listed telephone number in the telephone numbers whitelist, that the user is allowed to leave the voice mail message, and determine, when the second telephone number is not within the block of telephone numbers and the second telephone number does not match any telephone number listed in the telephone numbers whitelist, that the user is not allowed to leave the voice mail message.

13. One or more non-transitory computer-readable media comprising:

instructions which, when executed by one or more processors of a computing device, cause the one or more processors to:

receive a request for a first user, of a first telephone device, to leave a voice mail message for a second user of a second telephone device;

retrieve a profile associated with the second telephone device;

determine, based on the profile, whether the second telephone device is registered for a selective voice mail service;

determine, based on the profile, whether the first user is allowed to leave the voice mail message when the second telephone device is registered for the selective voice mail service by determining whether a first telephone number of the first telephone device is in a blacklist of telephone numbers, wherein the profile includes the blacklist;

allow the first user to leave the voice mail message for the second user of the second telephone device when the second telephone device is not registered for the selective voice mail service or when it is determined that the first telephone number is not in the blacklist; and prevent the first user from leaving the voice mail message it is determined that the first telephone number is in the blacklist.

14. The media of claim 13, where the request comprises at least one of:

contact information associated with the first user or the second telephone device, or a second telephone number assigned to the second telephone device.

15. The media of claim 14, where the profile comprises the second telephone number, and where the profile is retrieved based on the second telephone number.

16. The media of claim 14, where determining whether the first user is allowed to leave the voice mail message comprises:

determining whether the profile specifies an identifier associated with the contact information, and determining that the first user is allowed to leave the voice mail message when the profile specifies the identifier.

17. The media of claim 16, where the identifier comprises a first telephone number assigned to the first telephone device, where the profile comprises:

a first whitelist that specifies one or more blocks of telephone numbers selected by the second user, and a second whitelist that specifies one or more telephone numbers selected by the second user, where the profile specifies the identifier when the first telephone number is included in one of the one or more blocks of the first whitelist or matches one of the one or more telephone numbers of the second whitelist.

* * * * *